United States Patent
Haxby

[19]

[11] Patent Number: 5,885,043
[45] Date of Patent: Mar. 23, 1999

[54] BALE BUTLER

[76] Inventor: Leonard A. Haxby, 3407 Wharton St., Butte, Mont. 59701

[21] Appl. No.: 110,280

[22] Filed: Jul. 6, 1998

[51] Int. Cl.⁶ .................................................. A01D 90/00
[52] U.S. Cl. .......................................... 414/24.5; 414/911
[58] Field of Search .................................. 414/24.5, 24.6, 414/911, 467

[56] References Cited

U.S. PATENT DOCUMENTS

| | | | |
|---|---|---|---|
| 3,938,682 | 2/1976 | Rowe | 414/24.5 |
| 3,944,095 | 3/1976 | Brown | 414/24.5 |
| 3,964,621 | 6/1976 | Youngkamp | 414/24.5 |
| 4,095,706 | 6/1978 | Schwien | 414/24.6 |
| 4,527,935 | 7/1985 | Fortenberry | 414/24.5 |
| 4,930,964 | 6/1990 | Doan | 414/24.5 |
| 5,013,202 | 5/1991 | Love | 414/24.5 |
| 5,496,144 | 3/1996 | Wetz | 414/24.5 |

*Primary Examiner*—Karen M. Young
*Assistant Examiner*—Douglas A. Hess

[57] ABSTRACT

A bale butler for transporting and feeding large round bales of hay includes a hay bale attachment frame and a carrying bed attached to each other in functional arrangement. The hay bale attachment frame has a front bar and a pair of bale connector arms pivotally mounted to the front bar. The hay bale attachment frame has a drawbar and a standard ball-type trailer hitch. Each of the bale connector arms has a hollow cylinder which provides for rotatable attachment of a pair of detachable bale attachment pins. The bale attachment pins are each sharpened on one end. The bale attachment pins have holes drilled perpendicular to the longitudinal axis at measured intervals and have slidably, perpendicularly mounted a plate. The bale butler has a carrying bed which consists of a rectangularly shaped deck. The deck has an axle rearward of the intermediate point of the long rectangular sides of the deck which axle has rotatively mounted hubs, wheels and tires. The deck has a pair of flexible stabilizing chains for attachment to a pair of stabilizing receiving attachments of the hay bale attachment frame. The deck has a collapsible handle. The bale butler has a plurality of two supports used to secure the hay bale attachment frame to the deck at the rear portions of both.

5 Claims, 3 Drawing Sheets

BALE BUTLER

BACKGROUND OF THE INVENTION

1. Field of the Invention

This invention pertains generally to improvements relating to hay bale transporters and feeders, and more particularly concerns large round hay bale transporters and feeders.

2. Description of the Prior Art

Technological advancements are resulting in farmers, and more particularly ranchers, using large round hay bales to a greater extent for the feeding of livestock, said large round hay bales being relatively easily produced but bulky and cumbersome to transport and feed, particularly when transported and fed one at a time.

A variety of devices used lifting and transporting, and coincidentally feeding, large round hay bales appear in the prior art. Large round hay bale lifting and transporting devices of the general type to which the present invention pertains have been heretofore known in the art. It has been found that large round hay bales can be satisfactorily held, transported and fed or unrolled by using a framework which is substantially smaller than the large round hay bale to be handled. It has also been found that many of the devices appearing in the prior art generally require varying degrees of modification of the transport vehicle and may result in the substantial weight of the large round hay bale being borne by the axle of the transport vehicle, thus increasing wear and tear on such vehicle. In addition, it has been found that feeding of only a portion of a large round bale often necessitates leaving the remaining unfed potion on the transport vehicle for periods of time.

For this reason, it would be highly beneficial to provide a large round hay bale transporter and feeder, or a bale butler, which in addition to including the well-known and beneficial features, includes other features which are specially adapted to assist in the performing of the activities of transporting and feeding, is simple and economical to construct and repair, and requires no modifications and reduces wear and tear on the transport vehicle.

SUMMARY OF THE INVENTION

The large round hay bale transporter and feeder, or bale butler, in accordance with the present invention includes, in general, two principal structural assemblies which are attached to each other in functional arrangement; a hay bale attachment frame and a carrying bed. The hay bale attachment frame comprises a front bar and a pair of bale connector arms pivotally mounted to the front bar. The front bar pivotally attaches at each end to a front portion of one each of the pair of two bale connector arms. The front bar is pivotally connected to the pair of two bale connector arms by means of gusset plates mounted on each of the pair of bale connector arms. The gusset plates each have drilled therethrough a pair of holes, which pair of holes lie parallel to the longitudinal axis of the front bar and correspond with a pair of holes drilled through each end of the front bar and the gusset plates. Two pins are placed through the pair of holes through each of the gusset plates as well as through the pair of holes drilled through each end of the front bar, thereby securing each of the pair of bale connector arms perpendicularly to the front bar. Removal of one of the two pins from each of the gusset plates allows each of the pair of bale connector arms to pivot inwardly toward and lie parallel to the longitudinal axis of the front bar. The hay bale attachment frame has a drawbar, which drawbar is securely attached to and extends in a direction forward of the front bar, i.e., toward a transport vehicle. The drawbar has a standard ball-type trailer hitch, which standard ball-type hitch is securely attached to an extreme forward portion of the drawbar and is used for attachment to a standard trailer hitch ball on the transport vehicle, which attachment allows for rotational movement of the standard ball-type trailer hitch on the standard trailer hitch ball. The drawbar has two support beams, which two support beams are securely attached to and extend generally rearward and outward of each other in triangular fashion from an attachment point on the drawbar rearward of the standard ball-type trailer hitch to a secure attachment each to the front bar of the hay bale attachment frame. The hay bale attachment frame has a pair of stabilizing means receiving attachments. One each of the pair of stabilizing means receiving attachments is securely attached to the front bar on each outward end thereof interior of the attachment of the support beams thereto. The hay bale attachment frame has a drilled attachment, which drilled attachment securely attaches to the front bar intermediate of the first end and the second end of the front bar.

Each of the bale connector arms, on the end opposite the attachment to the front bar, has a hollow cylinder therethrough, which hollow cylinders each provide for rotatable attachment therethrough of detachable bale attachment pins. Each hollow cylinder has a grease zerk placed therein, which grease zerk provides for lubrication within each hollow cylinder. The bale attachment pins are each sharpened on one end. The bale attachment pins each have holes drilled through the end opposite the sharpened end, which holes are drilled perpendicular to the longitudinal axis of the bale attachment pin at measured intervals. Each of the bale attachment pins further has slidably mounted thereon and perpendicular thereto a plate, which plate serves to snugly abut the round bale when the sharpened end of the bale attachment pin is secured within the round hay bale. The plates each have a cylinder placed in the center thereof, which cylinder is securely attached to the plate and which cylinder allows for sliding of the plate on the bale attachment pin. Each cylinder has a hole drilled perpendicularly therethrough, which hole accommodates a pin placed therethrough and through the appropriate measured interval hole through the bale attachment pin for securing the plate to the bale attachment pin as adjustments for the width of the round bale are accomplished, thus providing for the pinning of the bale attachment pin and the plate solidly against the side of the round bale. Each of the cylinders in the plates has a grease zerk mounted thereon for provision of lubricant to the cylinders to assist in rotation and sliding within the cylinders by the bale attachment pins.

The bale butler has a carrying bed. The carrying bed consists of a rectangularly shaped deck. The deck has an axle of at least 2000 pounds rating located and attached perpendicular to the long rectangular sides of the deck rearward of the intermediate point of the long rectangular sides of the deck. The axle has hubs, wheels and tires. The deck has a pair of flexible stabilizing means attached thereto, which flexible stabilizing means are for attachment one each to one each of the pair of stabilizing means receiving attachments on the front bar of the bale attachment frame. The flexible stabilizing means provide for attachment of the deck to the hay bale attachment frame for transport of a round hay bale. The deck has a collapsible handle for manually moving the carrying bed into place at the foot of a round hay bale for attachment thereto. The deck has a pair of stabilizing means securing attachments, which pair of stabilizing means securing attachments are securely attached to the deck and provide attachment of the pair of flexible stabilizing means which provide for attachment of the deck to the hay bale attachment frame. The deck has a second drilled attachment securely attached thereto, which second drilled attachment is securely attached to the rear of the deck and is intermediate of the rear of the deck.

The bale butler has two supports, with two supports being one each removably attachable in rotatable manner to one each of two mounts attached one each to the outer ends of the rear of the deck. The two supports each have holes drilled through the upper and lower ends thereof, which holes in the upper ends accommodate in rotatable manner the ends of the bale attachment pins which are not sharpened and which holes in the lower ends accommodate in rotatable manner the mounts attached one each to the outer ends of the rear of the deck. The supports are used to secure the hay bale attachment frame to the deck at the rear portions of both.

It is an object of the present invention to provide a large round hay bale transporter and feeder, or bale butler, said large round hay bale transporter and feeder being relatively inexpensive and easily manufactured and repaired.

It is a further object of the present invention to provide a large round hay bale transporter and feeder, or bale butler, which reduces wear and tear on the transport vehicle.

It is a further object of the present invention to provide a large round hay bale transporter and feeder, or bale butler, which requires no significant modifications or additions to the transport vehicle.

It is a further object of the present invention to provide a large round hay bale transporter and feeder, or bale butler, which does not require the leaving of unfed portions of the large round hay bales on the transport vehicle.

IN THE DRAWINGS

DESCRIPTION OF THE PREFERRED EMBODIMENT

Figure 1:
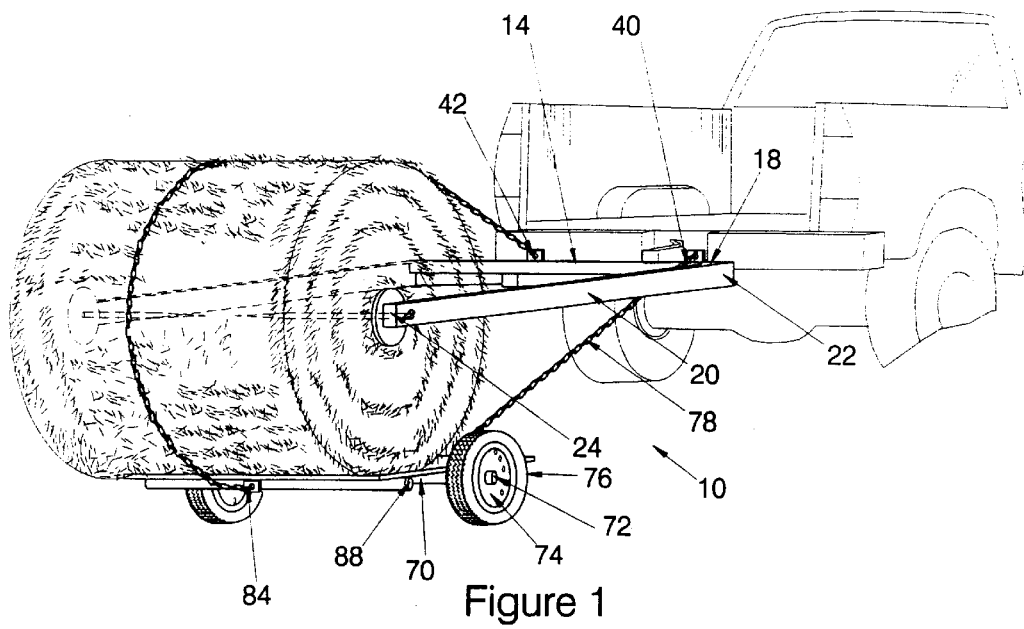
FIG. 1 is a perspective view of the instant invention with a large round bale.
Figure 2:
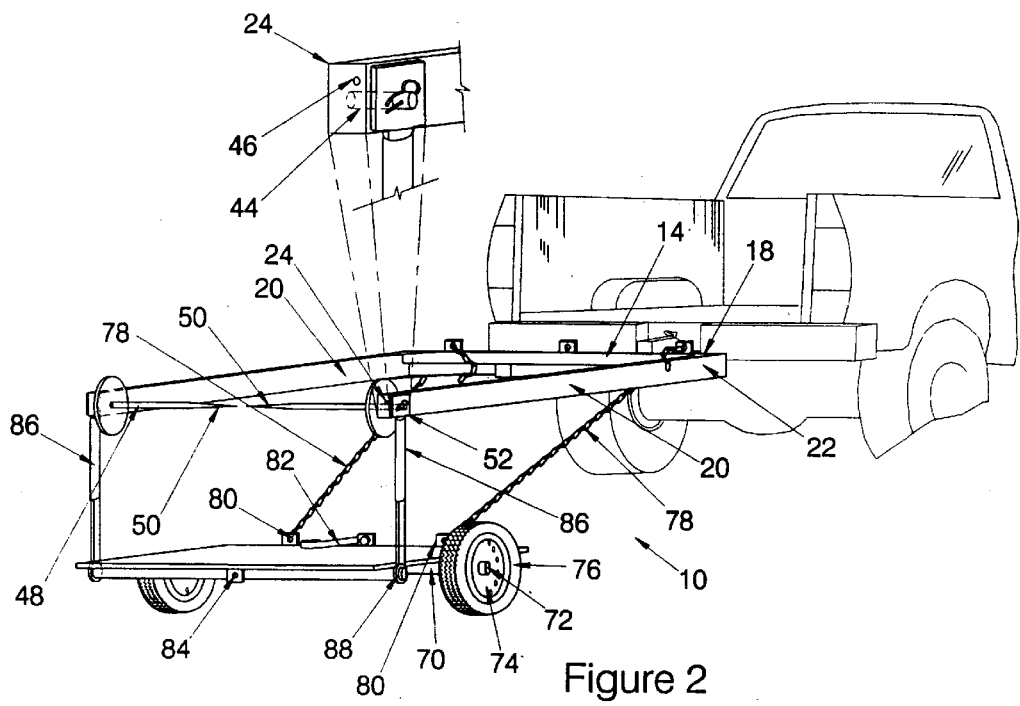
FIG. 2 is a perspective view of the instant invention without a large round bale.
Figure 3:
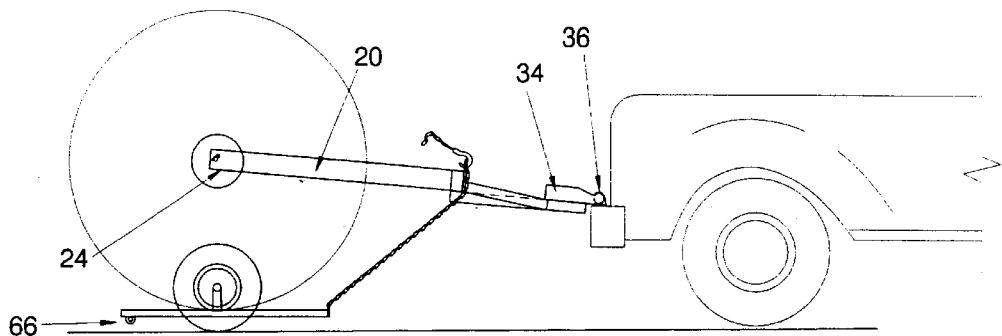
FIG. 3 is a side view of the instant invention attached to the rear of a transport vehicle.
Figure 4:
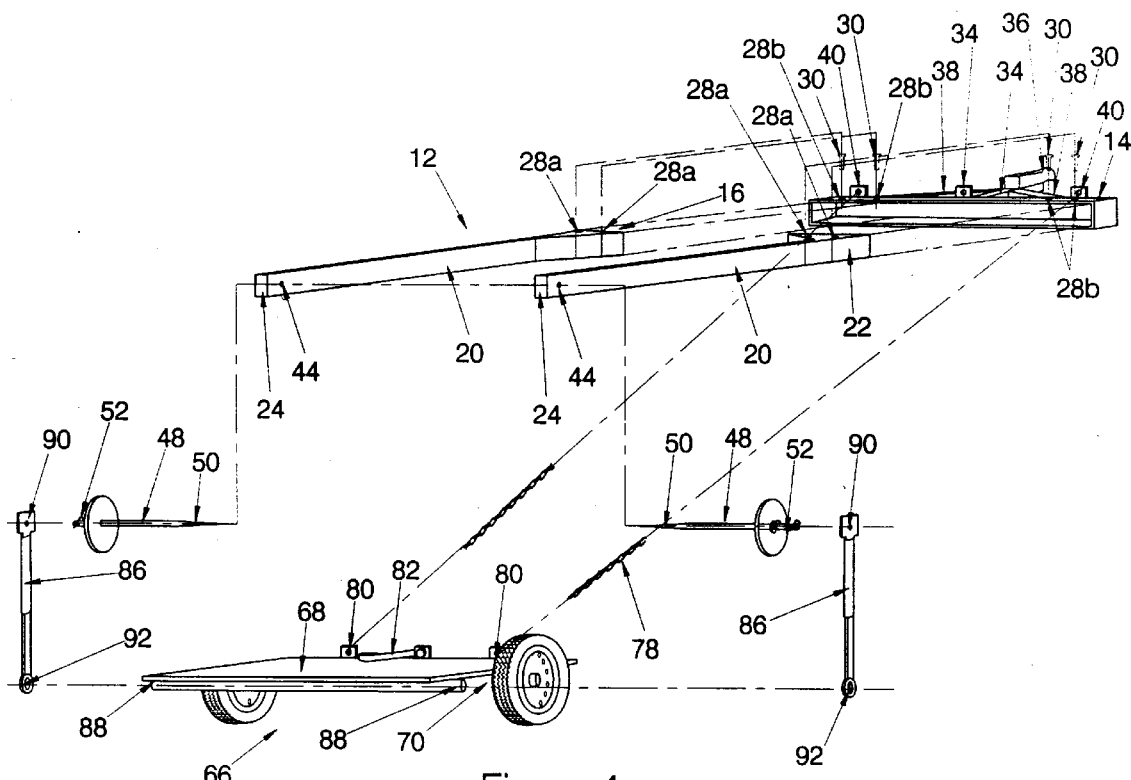
FIG. 4 is an expanded view of the instant invention.
Figure 5:
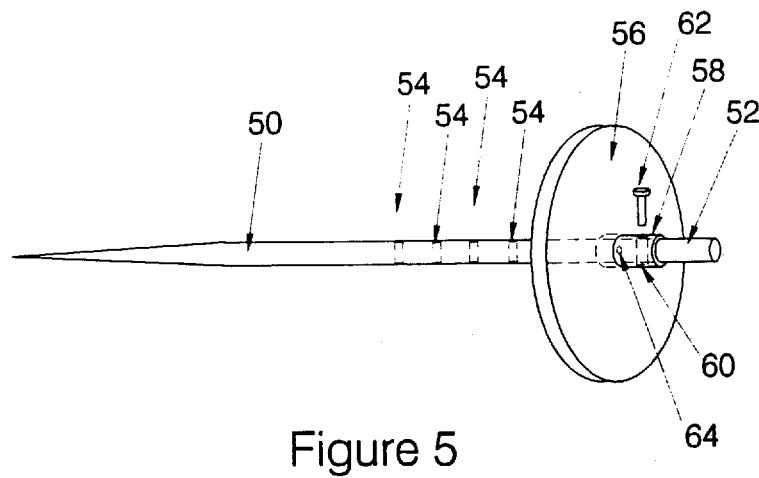
FIG. 5 is a top view of a gusset plate of the instant invention.
Figure 6:
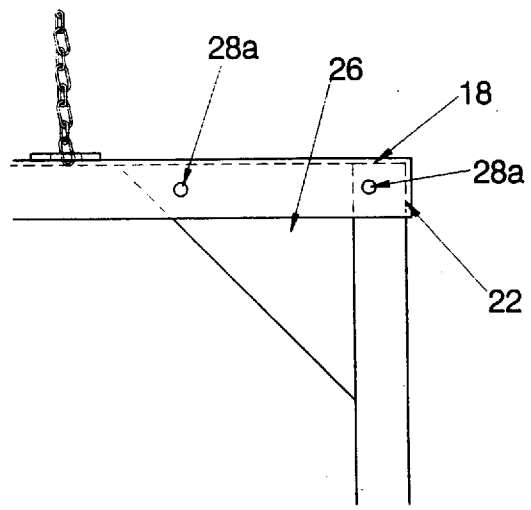
FIG. 6 is a top view of a bale connector arm pivotally connecting to the front bar.

Referring now more particularly to the drawings, reference numerals will be used to denote like parts or structural features in the different views. While a particular embodiment of the invention has been shown and described, it will be understood that the invention is not limited thereto, since modifications may be made that will become apparent to those skilled in the art.

A large round hay bale transporter and feeder, or bale butler 10, embodying the principles of the present invention, for use with a transport vehicle, is shown in FIG. 1 of the drawings to illustrate the presently preferred embodiment of the present invention. The bale butler 10 of the present invention embodies, in general, two principal structural assemblies which attach to each other in functional arrangement; a hay bale attachment frame 12 and a carrying bed 66.

As shown in FIGS. 2 through 6, the hay bale attachment frame 12 comprises a front bar 14 and a pair of bale connector arms 20 pivotally mounting to the front bar 14. The front bar 14 has a first end 16, a second end 18, and a longitudinal axis. The pair of bale connector arms 20 each have a first end 22 and a second end 24. The front bar 14 pivotally attaches at the first end 16 to the first end 22 of one of the pair of bale connector arms 20 and at the second end 18 to the first end 22 of the other of the pair of bale connector arms 20. The front bar 14 is pivotally connected to the pair of bale connector arms 20 by means of a pair of gusset plates 26 mounted one each to one each of the first ends 22 of the pair of bale connector arms 20. The pair of gusset plates 26 each have drilled therethrough a pair of holes 28a, which pair of holes 28a in each gusset plate 26 are parallel to the longitudinal axis of the front bar 14 and correspond with a pair of holes 28b drilled through each the first end 16 and the second end 18 of the front bar 14 when each of the pair of bale connector arms 20 are positioned one at the first end 16 of the front bar 14 and one at the second end 18 of the front bar 14 for attachment thereto. A pair of pins of four pins 30 are placed through each of the pair of holes 28a through each of the pair of gusset plates 26 as well as through the pair of holes 28b drilled through the first end 16 and the second end 18 of the front bar 14, thereby securing each of the pair of bale connector arms 20 perpendicularly to the front bar 14. Removal of one pin of the pair of pins 30 from each of the pair of gusset plates 26 allows each of the pair of bale connector arms 20 to pivot inwardly toward and lie parallel to the longitudinal axis of the front bar 14.

The hay bale attachment frame 12 has a drawbar 34, which drawbar 34 is securely attached to and extends in a direction forward of the front bar 14, i.e., toward the transport vehicle. The drawbar 34 has a standard ball-type trailer hitch 36, which standard ball-type hitch 36 is securely attached to an extreme forward portion of the drawbar 34 and is used for attachment to a standard trailer hitch ball on the transport vehicle, which attachment allows for rotational movement of the standard ball-type trailer hitch 36 on the standard trailer hitch ball. The drawbar 34 has two support beams 38, which two support beams 38 are securely attached to and extend generally rearward and outward of each other in triangular fashion from an attachment point on the drawbar 34 rearward of the standard ball-type trailer hitch 36 to a secure attachment each to the front bar 14 of the hay bale attachment frame 12. The hay bale attachment frame 12 has a pair of stabilizing means receiving attachments 40. One each of the pair of stabilizing means receiving attachments 40 is securely attached to the front bar 14 on each the first end 16 and the second end 18 thereof interior of the attachment of the support beams 38 thereto.

The hay bale attachment frame 12 has a drilled attachment 42, which drilled attachment 42 is securely attached to the front bar 14 intermediate of the pair of stabilizing means receiving attachments 40. The drilled attachment 42 is utilized in conjunction with a second drilled attachment 84 secured to the deck 68 and provides for attachment thereto of a chain or rope or other cinching material which goes over the top of the large round hay bale for further securing the same to the bale butler 10.

Each of the bale connector arms 20, on the second end 24, has a hollow cylinder 44 therethrough, which hollow cylinders 44 each provide for rotatable attachment therethrough of a pair of detachable bale attachment pins 48. Each hollow cylinder 44 has a grease zerk 46 placed therein, which grease zerk 46 provides for lubrication within each hollow cylinder 44.

The pair of bale attachment pins 48 have a longitudinal axis and are each sharpened on a first end 50 and each have holes 54 drilled through a second end 52, which holes 54 are drilled perpendicular to the longitudinal axis of the bale attachment pin 48 at measured intervals.

Each of the pair of bale attachment pins 48 further has slidably mounted thereon and perpendicular thereto a plate 56, which pair of plates 56 serve to snugly abut the round bale when the sharpened end 50 of the bale attachment pin 48 is secured within the round hay bale. The pair of plates 56 each have a cylinder 58 placed in the center thereof, which cylinder 58 is securely attached to the plate 56 and which cylinder 58 allows for sliding of the plate 56 on the bale attachment pin 48. Each cylinder 58 has a hole 60 drilled perpendicularly therethrough, which hole 60 accommodates a pin 62 placed therethrough and through the appropriate measured interval hole 54 through the bale attachment pin 48 for securing the plate 56 to the bale attachment pin 48 as adjustments for the width of the round bale are accomplished, thus providing for the pinning of the bale attachment pin 48 and the plate 56 solidly against the side of the round bale. Each of the cylinders 58 in the pair of plates 56 has a grease zerk 64 mounted thereon for provision of lubricant to the cylinders 58 to assist in rotation and sliding within the cylinders 58 by the bale attachment pins 48.

The bale butler has a carrying bed 66. The carrying bed 66 consists of a rectangularly shaped deck 68 which has an axle 70 located and attached perpendicular to the long rectangular sides of the deck 68 rearward of the intermediate point of the long rectangular sides of the deck 68. The axle 70 has two hubs 72, two wheels 74 and two tires 76. In one embodiment, the axle 70 has at least 2000 pounds rating.

The deck 68 has a pair of flexible stabilizing means 78 attached thereto, which pair of stabilizing means 78 are for attachment one each to one each of the pair of stabilizing means receiving attachments 40 on the front bar 14 of the bale attachment frame 12. The pair of flexible stabilizing means 78 provide for attachment of the deck 68 to the hay bale attachment frame 12 for transport of a round hay bale. When the pair of flexible stabilizing means 78 are attached to the front bar 14 and the large round hay bale is loaded onto the carrying bed 66, the pair of flexible stabilizing means 78 will draw tight resulting in the front of the carrying bed 66 being off the ground. In one embodiment, the pair of flexible stabilizing means 78 comprises metal chains and the pair of stabilizing means receiving attachments 40 of the front bar 14 comprise a pair of notched chain receiving attachments.

The deck 68 has a collapsible handle 82 for manually moving the carrying bed 66 into place at the foot of a round hay bale for attachment thereto.

In one embodiment, the deck 68 of the carrying bed 66 is generally rectangular shaped, having two parallel side beams, a front beam, a rear beam, a plurality of two inner braces, and an axle brace. The two parallel side beams are securely attached at the extreme ends of each in perpendicular manner to the extreme ends each of the front beam and the rear beam, to thus form the rectangular shape of the carrying bed. The two inner braces are securely attached at the extreme ends of each to each the front beam and the rear beam and are parallel in spaced relation with the two parallel side beams. The axle brace is securely attached to one each of the side beams and each of the two inner braces. The axle has a first end and a second end thereof, with the first end extending outward beyond one of the two parallel side beams on one side of the carrying bed and the second end extending outward beyond the other of the two parallel side beams of the carrying bed. The first end and the second end of the axle are each adapted to support and accommodate a hub, wheel and tire.

The deck 68 has a pair of stabilizing means securing attachments 80, which pair of stabilizing means securing attachments 80 are securely attached to the deck 68 and provide attachment of the pair of flexible stabilizing means 78 which provide for attachment of the deck 68 to the hay bale attachment frame 12.

The deck 68 has a second drilled attachment 84 securely attached thereto, which second drilled attachment 84 is securely attached to the rear of the deck 68 and is intermediate of the rear of the deck 68.

The bale butler 10 has two supports 86, with the two supports 86 being one each removably attachable in rotatable manner to one each of two mounts 88 attached one each to the outer ends of the rear of the deck 68. The two supports 86 each have an upper hole 90 and a lower hole 92, which upper holes 90 accommodate in rotatable manner the second ends 52 of the bale attachment pins 48, and which lower holes 92 accommodate in rotatable manner the mounts 88 attached one each to the outer ends of the rear of the deck 68. The supports 86 are used to secure the hay bale attachment frame 12 to the deck 68 at the rear portions of both.

In operation, the bale butler 10 is designed to easily feed round bales either totally or partially. A round bale is generally hay which is wrapped into a cylindrical shape and held in such configuration by baling twine wrapped around the bale. Once the baling twine is cut and removed from the bale, pulling the bale will unwrap it in an even windrow. The bale butler 10 is designed to pull the round bale without the carrying bed 66 with a small motorized vehicle equipped with a standard trailer hitch. The carrying bed 66 is designed and built for transporting one round bale. The design of the carrying bed 66 is that of a simple fulcrum, i.e., the axle 70 of the carrying bed 66 is located offset of the center of the long side of the carrying bed 66.

In use, the carrying bed 66 is placed in front of the round bale. The carrying bed 66 is then connected to the front bar 14 of the hay bale attachment frame 12 with the pair of flexible stabilizing means 78. The hay bale attachment frame 12 is then connected to the round bale by means of the pair of detachable bale attachment pins 48 located one each on the second ends 24 of the pair of bale connector arms 20 of the hay bale attachment frame 12. The pair of bale connector arms 20 are then pinned in place by means of the pair of gusset plates 26 such that they become solid with the front bar 14. The standard ball-type trailer hitch 36 of the drawbar 34 of the hay bale attachment frame 12 is then attached to the standard trailer hitch ball of the transport vehicle. By moving the transport vehicle slowly forward, the round bale is pulled onto the carrying bed 66. As the round bale passes the axle 70 of the carrying bed 66, the bale is moved to the front of the carrying bed 66 lifting the rear of the carrying bed 66 off the ground. The pair of flexible stabilizing means 78 connected to the front bar 14 and the deck 68 of the carrying bed 66 hold the front of the carrying bed 66 from falling to the ground and the round bale can then be transported via the bale butler 10.

To feed the round bale, the baling twine is cut and removed from the round bale. The carrying bed 66 is either totally removed or drawn sufficiently ahead of the round bale and attached to the hay bale attachment frame 12 so that it won't interfere with the free movement of the round bale when it is pulled and unwrapped. If the entire round bale is not needed for a single feeding, the carrying bed 66 may be replaced under the unused portion of the round bale, while the same is still attached to the hay bale attachment frame 12, and the unused portion of the round bale may be transported for future feeding. There are no mechanical parts of the bale butler 10 and no extra accessories of modifications need be made to the transport vehicle.

What is claimed is:

1. A bale butler adapted for use with a transport vehicle, comprising:

a hay bale attachment frame;

said hay bale attachment frame having a front bar and a pair of bale connector arms pivotally mounting to said front bar;

said front bar having a first end, a second end and a longitudinal axis;

said pair of bale connector arms each having a first end and a second end;

said front bar pivotally attaching at said first end to said first end of one of said pair of bale connector arms and at said second end to said first end of the other one of said pair of bale connector arms;

said front bar being pivotally connected to said pair of bale connector arms by means of a pair of gusset plates, said pair of gusset plates being mounted one each to one each of said first ends of one each of said pair of bale connector arms;

said pair of gusset plates each having drilled therethrough a pair of holes, said pair of holes in each of said pair of gusset plates being parallel to said longitudinal axis of said front bar when said pair of bale connector arms are positioned for attachment to said front bar;

four pins, with a pair of said of four pins being placed through each of said pair of holes through each of said pair of gusset plates;

said front bar having a pair of holes drilled through each of said first end and said second end;

the other pair of pins of said four pins being placed through each of said pair of holes drilled through each of said first end and said second end of said front bar, pivotally attaching said front bar at said first end to said first end of one of said pair of bale connector arms and at said second end to said first end of the other one of said pair of bale connector arms;

said hay bale attachment frame having a drawbar, said drawbar being securely attached to and extending from said front bar;

said drawbar having a standard ball-type trailer hitch, said standard ball-type hitch being securely attached to said drawbar;

said drawbar having two support beams, said two support beams being securely attached to and extending generally rearward and outward of each other in triangular fashion from an attachment point on said drawbar rearward of said standard ball-type trailer hitch;

said two support beams being securely attached each to said front bar;

said hay bale attachment frame having a pair of stabilizing means receiving attachments;

said pair of stabilizing means receiving attachments being one each securely attached to said front bar on said first end and said second end thereof;

said hay bale attachment frame having a drilled attachment, said drilled attachment being securely attached to said front bar intermediate of said first end and said second end;

said second end of each of said pair of bale connector arms having a hollow cylinder therethrough, said hollow cylinders each having a grease zerk placed therein, said grease zerk providing for lubrication within each hollow cylinder;

said bale attachment frame having a pair of detachable bale attachment pins, said pair of detachable bale attachment pins each being sharpened on a first end and having holes drilled perpendicular to a longitudinal axis of said bale attachment pin at measured intervals on a second end;

said hollow cylinders providing for rotatable attachment therethrough of said pair of detachable bale attachment pins;

said pair of bale attachment pins having slidably mounted thereon and perpendicular thereto a pair of plates, said pair of plates being one each mounted on one each of said pair of bale attachment pins;

said pair of plates each having a cylinder placed in the center thereof, one each of said cylinders being securely attached to one each of said pair of plates;

said cylinder allowing for sliding of said pair of plates on said bale attachment pins;

said cylinders each having a hole drilled perpendicularly therethrough, said hole accommodating a pin placed therethrough and through an appropriate measured interval hole through said bale attachment pin;

said cylinders in said plates each having a grease zerk, said grease zerk providing lubricant to said cylinders;

a carrying bed, said carrying bed having a rectangularly shaped deck;

said deck having an axle located and attached perpendicular to and rearward of an intermediate point of long rectangular sides of said deck;

said axle having a two hubs, a two wheels and two tires rotatively mounted on said axle;

said deck having a pair of flexible stabilizing means attached thereto;

said deck having a pair of stabilizing means securing attachments, said pair of stabilizing means securing attachments being securely attached to said deck and providing attachment for said pair of flexible stabilizing means;

said pair of flexible stabilizing means attaching one each to one each of said pair of stabilizing means receiving attachments of said front bar of said hay bale attachment frame;

said deck having a collapsible handle;

said deck having a second drilled attachment, said second drilled attachment being securely attached to said deck;

said bale butler having a pair of supports, said pair of supports being one each removably attachable in rotatable manner to one each of two mounts attached one each to outer ends of a rear portion of said deck; and, said pair of supports each having an upper hole and a lower hole, said upper holes accommodating in rotatable manner said second ends of said bale attachment pins, and said lower holes accommodating in rotatable manner said mounts attached one each to outer ends of the rear of said deck.

2. The bale butler as claimed in claim 1, wherein said axle further comprises at least 2000 pounds rating.

3. The bale butler as claimed in claim 1, wherein said deck further comprises:

two parallel side beams;

a front beam;

a rear beam;

two inner braces;

an axle brace;

said two parallel side beams being securely attached at extreme ends of each in perpendicular manner to extreme ends each of said front beam and said rear beam, forming rectangular shape of said deck;

said two inner braces being securely attached at the extreme ends of each to each said front beam and said rear beam and being parallel in spaced relation with said two parallel side beams;

said axle brace being securely attached to one each of said side beams and each of said two inner braces;

said axle having a first end and a second end, with said first end extending outward beyond one of said two parallel side beams on one side of said deck and said second end extending outward beyond the other of said two parallel side beams of said deck; and, said first end and said second end of said axle each being adapted to rotatively support said hub, said wheel and said tire.

4. The bale butler as claimed in claim 1, wherein said pair of flexible stabilizing means further comprises a pair of metal chains.

5. The bale butler as claimed in claim 4 wherein said pair of stabilizing means receiving attachments further comprises a pair of notched chain attachments.

* * * * *